United States Patent
Baumeister et al.

(10) Patent No.: US 12,161,974 B2
(45) Date of Patent: Dec. 10, 2024

(54) PROCESS FOR MAKING A FILTRATION AND/OR DIFFUSION DEVICE

(71) Applicant: GAMBRO LUNDIA AB, Lund (SE)

(72) Inventors: Franz Baumeister, Unteruhldingen (DE); Christian Hirssig, Burladingen (DE); Tobias Beyer, Moessingen (DE)

(73) Assignee: GAMBRO LUNDIA AB, Lund (SE)

( * ) Notice: Subject to any disclaimer, the term of this patent is extended or adjusted under 35 U.S.C. 154(b) by 850 days.

(21) Appl. No.: 17/272,982

(22) PCT Filed: Sep. 3, 2019

(86) PCT No.: PCT/EP2019/073407
§ 371 (c)(1),
(2) Date: Mar. 3, 2021

(87) PCT Pub. No.: WO2020/048948
PCT Pub. Date: Mar. 12, 2020

(65) Prior Publication Data
US 2021/0322926 A1    Oct. 21, 2021

(30) Foreign Application Priority Data
Sep. 4, 2018 (EP) .................................. 18192571

(51) Int. Cl.
*B01D 63/02* (2006.01)
*B01D 61/14* (2006.01)

(52) U.S. Cl.
CPC ........ *B01D 63/0221* (2022.08); *B01D 61/145* (2013.01); *B01D 2313/21* (2013.01)

(58) Field of Classification Search
CPC ........................... B01D 63/022; B01D 61/145
See application file for complete search history.

(56) References Cited

U.S. PATENT DOCUMENTS 6,224,765 B1 * 5/2001 Watanabe ............ B01D 63/022
210/321.89

FOREIGN PATENT DOCUMENTS

| EP | 0803281 | 10/1997 |
|----|---------|---------|
| JP | H04134425 | 12/1992 |
| JP | 06262043 A * | 9/1994 |
| JP | H06262043 | 9/1994 |
| WO | WO2013/190022 | 12/2013 |

OTHER PUBLICATIONS

PCT Search Report and Written Opinion prepared for PCT/EP2019/073407, completed Oct. 4, 2019.

* cited by examiner

*Primary Examiner* — Dah-Wei D. Yuan
*Assistant Examiner* — Kristen A Dagenais
(74) *Attorney, Agent, or Firm* — Barnes & Thornburg LLP

(57) ABSTRACT

The present disclosure relates to a process for producing a filtration and/or diffusion device, e.g., a capillary dialyzer or an ultrafilter.

12 Claims, 3 Drawing Sheets

PROCESS FOR MAKING A FILTRATION AND/OR DIFFUSION DEVICE

CROSS-REFERENCE TO RELATED APPLICATIONS

This application is the U.S. national phase of PCT/EP2019/073407, filed on Sep. 3, 2019, which claims the benefit of European Patent Application Serial Number 18192571.0, filed on Sep. 4, 2018, the entire disclosures of both of which are incorporated herein by reference.

TECHNICAL FIELD

The present disclosure relates to a process for producing a filtration and/or diffusion device, e.g., a capillary dialyzer or an ultrafilter.

DESCRIPTION OF THE RELATED ART

Common processes for manufacturing a capillary dialyzer involve producing a bundle of hollow fiber membranes, transferring the bundle into a tubular housing, sealing the ends of the hollow fibers present in the bundle, closing the mouths of the housing with potting caps, potting both ends of the bundle with a potting agent to produce end wall means within the tubular housing that separate the outer surface of the hollow fiber membranes from their lumen, and re-opening the ends of the individual hollow fibers by cutting off a portion of the end walls.

WO 2013/190022 A1 discloses a capillary dialyzer with support rings disposed between the end wall means and the housing at the first and second ends of the tubular housing. The support rings are positioned on a ledge inside the tubular housing and are interlocked with the potting material forming the end wall means.

The ends of the hollow fiber membranes have to be sealed before potting the ends of the fiber bundle using a potting resin, e.g., a polyurethane. This is necessary to prevent the potting resin from being sucked into the hollow fibers by capillary forces, thus clogging the fibers. The hollow fiber membranes can be sealed by melting the ends of the individual fibers.

JP 2003/062433 A discloses a method for manufacturing a hollow fiber membrane module capable of efficiently performing the potting of the end part of a hollow fiber membrane bundle without infiltrating a potting agent into the hollow fiber membranes. In this manufacturing method, the hollow fiber membrane bundle is inserted into the cylindrical case so that the end part thereof protrudes from the cylindrical case; the end part is collapsed and sealed to be potted to the opening of the cylindrical case; and the collapsed and sealed part is subsequently cut off.

U.S. Pat. No. 4,341,005 A discloses a process for the production of hollow fiber fluid fractionation cells which involves placing a series of half sections of the longitudinal walls of the cell on the periphery of a winding wheel; winding fluid-filled permeable hollow fibers thereabout until the section is full or slightly over-full; placing another mating half shell over each fiber-filled section on the wheel and assembling the cell core; cutting the courses between each section and draining the fluid therefrom; putting an initial fluid potting compound about the courses of fibers and centrifugally casting the potting compound about the fibers at each end of the cell; and cutting the fibers at each end within the area of the potting compound to re-expose the hollow cores thereof.

EP 0 803 281 A1 discloses a filter element comprising (1) a bundle of hollow fiber type separation membranes made of a natural or synthetic macromolecular material, said bundle having an opening in at least one terminal part thereof; and (2) a sealed part made of a thermoplastic resin, e.g., polyethylene or polypropylene, bonded to said bundle at a temperature not higher than a melting or decomposing temperature of said macromolecular material, and adapted to seal watertightly said opening of said bundle in a half-bonded state showing no compatibility with said macromolecular material and permitting persistence of a mutual interface of bondage. One method for preparing the sealed part comprises melting the thermoplastic resin as the raw material for the sealed part in a depressed metallic die at a temperature not higher than the melting temperature of the raw material for the hollow fiber type separating membranes, inserting the open terminal parts of the bundled hollow fiber type separation membranes into the melt of the raw material for the sealed part to conduct a first sealing, again inserting the open terminal parts of the bundled hollow fiber type separation membranes into the melt of the raw material for the sealed part while the melt is at a temperature not higher than the melting temperature of the raw material for the hollow fiber type separation membranes to conduct a second sealing, and then cooling the bundle.

JP H06 262043 A discloses a hemodialyzer wherein the face of the partition wall being brought into contact with blood has a smoothly formed curved surface. To produce the hemodialyzer, a bundle of hollow fiber membranes is placed into a housing and the end of the bundle is immersed into a first liquid resin, e.g., polyethylene, polypropylene, or ethylene vinyl alcohol. The surface of the first liquid resin is formed into a curved surface, the liquid level of the resin in the space outside the hollow fiber membranes being lower than in the lumen of the hollow fiber membranes, and the resin is cured. Then a second resin for forming a partition wall, e.g., a polyurethane resin, is poured into the space between the ends of the hollow fiber membranes and between the ends of the hollow fiber membranes and the housing and the second resin is cured, forming a partition wall and fixing the end part of the hollow fiber bundle to the housing. The cured first resin subsequently is peeled off the partition wall surface.

It would be desirable to simplify the manufacturing process of filtration and/or diffusion devices, e.g., by eliminating one or more of the multiple steps required; or to streamline the manufacturing process by combining two or more of the process steps into a single process step.

SUMMARY

The present disclosure provides a process for making a filtration and/or diffusion device comprising a bundle of hollow fiber membranes in a tubular housing. The process involves sealing the ends of the fibers and the mouths of the tubular housing with a thermoplastic resin.

DETAILED DESCRIPTION

Figure 1:
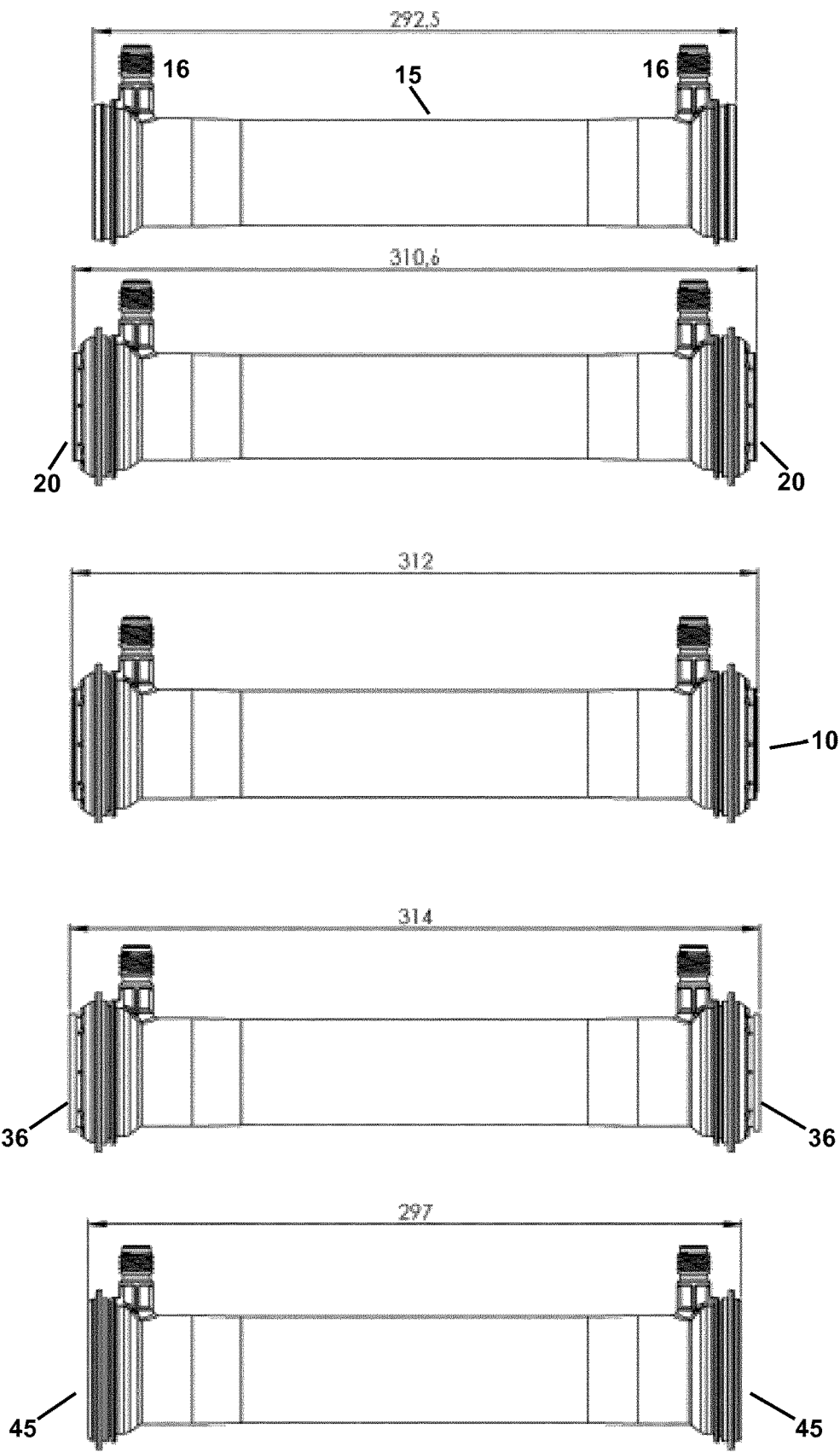
FIG. 1 is a schematic view of a filtration and/or diffusion device in different stages of an embodiment of the process of the present disclosure.

The present disclosure provides a process for producing a filtration and/or diffusion device comprising hollow fiber membranes. Examples of filtration and/or diffusion devices include capillary dialyzers, hemofilters, plasma filters, and ultrafilters. The process involves providing a bundle of hollow fiber membranes disposed within a tubular housing.

The present disclosure provides a process for the production of a filtration and/or diffusion device comprising a bundle of hollow fiber membranes disposed within a tubular housing, the process comprising sealing a first end of the bundle of hollow fiber membranes by dipping the first end of the bundle into a melt of thermoplastic resin and allowing the melt to solidify.

In one embodiment, the process further comprises sealing a first end of the tubular housing corresponding to the first end of the bundle by dipping the first end of the tubular housing into a melt of thermoplastic resin and allowing the melt to solidify.

In a further embodiment, the process also comprises sealing a second end of the bundle of hollow fiber membranes by dipping the second end of the bundle into a melt of thermoplastic resin and allowing the melt to solidify.

In a still further embodiment, the process also comprises sealing a second end of the tubular housing corresponding to the second end of the bundle by dipping the second end of the tubular housing into a melt of thermoplastic resin and allowing the melt to solidify.

The length of the fibers in the bundle is greater than the length of the tubular housing; and the ends of the fiber bundle protrude from the housing on both ends of the housing. In one embodiment, the length of the fiber bundle exceeds the length of the housing by 4 to 16 mm, for instance, 8 to 14 mm. Consequently, the ends of the bundle protrude from the mouths of the housing on each end of the housing by 2 to 8 mm, for instance, 4 to 7 mm.

The composition of the hollow fiber membranes present in the bundle is not particularly limited. A large variety of membranes comprising natural or synthetic polymers is suitable for use in the process of the present disclosure. Examples include fibers comprising cellulose or derivatives thereof; polysulfone (PS), polyethersulfone (PES), polyamide (PA), polyetherimide (PEI), polyacrylonitrile (PAN), poly(methylmethacrylate) (PMMA), polyvinylidene fluoride (PVDF), polytetrafluoroethylene (PTFE). In one embodiment, the fibers comprise a blend of at least one hydrophobic polymer and at least one hydrophilic polymer. In a particular embodiment, the fibers comprise a polysulfone, polyethersulfone, or polyarylethersulfone; in combination with a polyvinylpyrrolidone.

In one embodiment, the hollow fiber membranes have an inner diameter in the range of from 180 µm to 250 µm. In another embodiment, the inner diameter is in the range of from 185 µm to 195 µm. In still another embodiment, the inner diameter is in the range of from 210 µm to 220 µm.

In one embodiment, the wall thickness of the hollow fiber membranes is in the range of from 20 µm to 55 µm. In one embodiment, the wall thickness is 33 µm to 37 µm. In another embodiment, the wall thickness is 38 µm to 42 µm. In still another embodiment, the wall thickness is 43 µm to 47 µm. In yet another embodiment, the wall thickness is 48 µm to 52 µm.

The hollow fiber membranes can have a symmetric wall structure or an asymmetric wall structure. In one embodiment, the membrane wall has a symmetric sponge structure. In another embodiment, the membrane wall has an asymmetric sponge structure. In yet another embodiment of the process, the membrane wall has an asymmetric wall structure and comprises a layer having a finger structure, i.e., featuring macrovoids having a size of more than 5 µm.

In one embodiment, the number of fibers in the bundle of hollow fiber membranes ranges from 6,000 to 12,000, e.g. from 9,000 to 12,000. In one embodiment, the diameter of the bundle is in the range of from 20 to 50 mm, e.g., from 20 to 30 mm, or from 30 tom 45 mm. In most cases, the diameter of the bundle of hollow fiber membranes will correspond to the inner diameter of the tubular section of the housing, i.e., the fibers of the bundle spread across the entire cross-section of the housing.

Suitable tubular housings for filtration and/or diffusion devices are known in the art and are generally produced by injection molding. In one embodiment of the process, the housing is comprised of a transparent thermoplastic polymer. In one embodiment, the housing is comprised of polycarbonate. In another embodiment, the housing is comprised of polypropylene.

The tubular housing comprises a central tubular section and header sections at both ends of the central tubular section. In one embodiment, the diameter of the header sections is the same as the diameter of the tubular section. In another embodiment, the diameter of the header sections is larger than the diameter of the tubular section. The dimensions of the housing may vary over a range of different sizes. In one embodiment, the length of the housing is in the range of from 120 to 350 mm, for instance, from 130 to 170 mm, or from 240 to 300 mm. In one embodiment, the inner diameter of the housing is in the range of from 20 to 50 mm, e.g., from 20 to 30 mm, or from 30 tom 45 mm.

The tubular housing comprises at least one fluid port on its outer wall. The fluid port is configured to serve as a fluid inlet and/or a fluid outlet of the filtration and/or diffusion device. In one embodiment, the tubular housing comprises two fluid ports.

In one embodiment of the process, the mouths of the tubular housing are sealed by dipping one end of the housing into a melt of thermoplastic resin and allowing the melt to solidify; and then dipping the other end of the housing into a melt of thermoplastic resin and allowing the melt to solidify. Upon solidification, the molten thermoplastic resin forms continuous polymer blocks which seal the ends of the individual fibers in the fiber bundle and also seal the mouths of the housing, forming potting caps that prevent leakage of potting resin from the housing during the formation of the end wall means.

In one embodiment of the process, a two-step procedure is used. In a first step, only the ends of the fibers on an end of the bundle of hollow fibers are sealed by immersion in the melt of thermoplastic resin, producing a first block of thermoplastic resin attached to the end of the fiber bundle. In a second step, the mouth of the housing corresponding to the end of the bundle with the first block of thermoplastic resin also is sealed by immersion in the melt of thermoplastic resin, producing a second block of thermoplastic resin which encloses the first block.

Suitable thermoplastic resins have a glass transition temperature which is lower than the glass transition temperature of both the housing and the hollow fiber membranes present in the bundle. In one embodiment, the thermoplastic resin is a polyolefin. In a particular embodiment, the thermoplastic resin is polyethylene. In another embodiment, the thermoplastic resin is a polyester. Examples of suitable polyesters include polyethylene terephthalate (PET), polybutylene terephthalate (PBT). In a particular embodiment, the thermoplastic resin is a glycol-modified polyethylene terephthalate (PETG).

The initial temperature of the melt of thermoplastic resin in the dipping step, i.e., before the end of the housing is immersed in the melt, is higher than the melting point of the thermoplastic resin, e.g., at least 20 K above the melting point, or at least 50 K, or even at least 100 K above the melting point.

In one embodiment, the depth of the melt is in the range of from 1 to 5 mm, e.g., from 1 to 3 mm. In one embodiment of the process, the melt of thermoplastic resin is provided in a crucible with a diameter which is slightly larger than the outer diameter of the housing. In another embodiment of the process, the melt of thermoplastic resin is provided in a circular depression of a metal plate, the circular depression having a diameter which is slightly larger than the outer diameter of the housing. In one embodiment, the circular depression has a depth in the range of from 2 to 10 mm.

In one embodiment of the process, the melt is provided in the crucible or the metal plate, respectively, by dosing a melt of the thermoplastic resin into the crucible or the circular depression of the metal plate, respectively. In one embodiment, the temperature of the melt is in the range of from 250° C. to 360° C., e.g., in the range from 280° C. to 320° C.

In another embodiment of the process, the melt is provided in the crucible or the metal plate, respectively, by dosing solid particles of the thermoplastic resin, e.g., a powder or a granulate, into the crucible or the circular depression of the metal plate, respectively, and melting the thermoplastic resin by heating the crucible or the circular depression of the metal plate, respectively. In one embodiment, the temperature of the crucible or the circular depression of the metal plate, respectively, is in the range of from 250° C. to 360° C., e.g., in the range from 280° C. to 320° C.

In one embodiment, the crucible or the metal plate, respectively, are comprised of stainless steel. In another embodiment, the crucible or the metal plate, respectively, are comprised of aluminum. In a particular embodiment, the crucible or the metal plate, respectively, are coated with a nonstick coating to facilitate demolding. In one embodiment, the coating is based on polytetrafluoroethylene (PTFE; Teflon®); in another embodiment, the coating is a silica-based nonstick coating.

In one embodiment, the crucible or the metal plate, respectively, are provided with cooling elements or heat sinks, e.g., cooling coils attached to or embedded in the wall of the crucible or attached to or embedded in the metal plate, respectively. The cooling elements remove heat from the melt to accelerate its solidification after the end of the tubular housing has been immersed in the melt.

In another embodiment of the process, air or another inert fluid is introduced into the tubular housing of the filtration and/or diffusion device to cool down the melt after the end of the housing has been immersed in the melt. In one embodiment, the cooling fluid is introduced via at least one of the fluid ports of the tubular housing.

In one embodiment of the process, the ends of the tubular housing feature potting collars, i.e., a potting collar is mounted on each end of the housing before dipping the ends of the housing into the melt of thermoplastic resin. A potting collar is a separate tubular component part that can be mounted on an end of the tubular housing and provides an extension of the housing in longitudinal direction. The potting collars enclose the ends of the fiber bundle protruding from the housing. In one embodiment, the diameter of the potting collars is larger on one end of the collar than on the other end. In one embodiment, the larger diameter matches the outer diameter of the housing and the smaller diameter matches the diameter of the fiber bundle. In one embodiment, the inner surface of the potting collars is conical. In one embodiment, the potting collars extend the length of the housing by 5 to 10 mm on each end of the housing. In one embodiment, the ends of the fiber bundle protrude from the mouths of the potting collars by 1 to 3 mm. In another embodiment, the ends of the fiber bundle are flush with the mouths of the potting collars. The potting collars are comprised of a polymeric material, e.g., a thermoplastic resin. In one embodiment, the potting collars are comprised of a polyolefin, e.g., polyethylene. In a particular embodiment, the potting collars and the melt of thermoplastic resin comprise the same thermoplastic resin.

In one embodiment of the process, the mouth of the potting collar is dipped into the melt of thermoplastic resin and is sealed instead of the end of the tubular housing. The sealed potting collar replaces the potting form otherwise required for the subsequent potting step.

In another embodiment of the process, a support ring is present in each header section of the housing, i.e., at each end of the tubular housing, a support ring is disposed within the housing. A support ring is a separate annular component part which can be mounted on a ledge inside the tubular housing. The support ring is comprised of a polymeric material. The support ring is disposed between the end wall means and the inner wall surface of the housing, enclosing the fiber bundle and centering the bundle in the header section of the housing. The support ring is embedded at least partially in the end wall means produced by potting the ends of the fiber bundle with potting resin.

In one embodiment, the support ring comprises a tubular projection extending from the support ring in the direction of the end of the housing and protruding from the mouth of the housing by 0 to 5 mm, e.g., 0 to 3 mm. The tubular projection provides a cylindrical hollow enclosing the fiber bundle. In one embodiment, the support rings are comprised of a polyolefin, e.g., polypropylene. In a further embodiment, the material of the tubular projection is different from the material of the remainder of the support ring. For example, the body of the support ring is comprised of polypropylene, while the tubular projection is comprised of polyethylene.

In one embodiment, the ends of the fiber bundle protrude from the mouths of the tubular projection of the support ring by 1 to 3 mm. In another embodiment, the ends of the fiber bundle are flush with the mouths of the tubular projection of the support ring.

In one embodiment of the process, the mouth of the tubular projection of the support ring is dipped into the melt of thermoplastic resin and is sealed instead of the end of the tubular housing. The sealed tubular projection replaces the potting form otherwise required for the subsequent potting step.

Once both ends of the housing have been sealed with solidified melt, a potting step can ensue. The potting step involves the formation of end walls within the tubular housing by embedding the ends of the fiber bundle in a potting resin, e.g., a polyurethane.

After the potting resin has set and the end walls have been formed, the ends of the potted fiber bundle are cut off together with part of the solidified potting resin to re-open the fibers.

In one embodiment of the process employing potting collars, part of the sealed potting collars is also cut off together with the ends of the potted fiber bundle and part of the solidified potting resin; and the remaining parts of the potting collars are removed from the ends of the housing they are mounted on.

In another embodiment of the process employing support rings with tubular projections, the parts of the sealed tubular projections protruding from the tubular housing are also cut off together with the ends of the potted fiber bundle and part of the solidified potting resin.

Subsequently, an end cap featuring a fluid port is mounted on each end of the tubular housing to complete assembly of the filtration and/or diffusion device.

An advantage of the process of the invention is that closure of the fiber ends and the mouths of the housing are performed simultaneously in a single process step. In prior art processes, these steps are performed consecutively in two separate steps. The process of the present disclosure therefore is simpler and faster than the prior art processes.

It will be understood that the features mentioned above and those described hereinafter can be used not only in the combination specified but also in other combinations or on their own, without departing from the scope of the present invention.

The process of the present disclosure will now be further described in the following examples and referring to the attached figures.

FIG. 1 is a schematic view of a filtration and/or diffusion device in different stages of an embodiment of the process of the present disclosure. From top to bottom, FIG. 1 shows:
1. A tubular housing 15 featuring two fluid ports 16 and having an overall length of 292.5 mm;
2. The tubular housing 15 with potting collars 20 mounted on the mouths of the housing at each end, extending the overall length to 310.6 mm;
3. The tubular housing 15 with potting collars 20 and a bundle 10 of hollow fiber membranes disposed in the housing 15. The ends of the bundle 10 protrude from the mouths of the potting collars 20, extending the overall length to 312 mm;
4. The tubular housing 15 with potting collars 20 and a bundle 10 of hollow fiber membranes disposed in the housing 15, after closure of the fiber ends and the mouths of the potting collars 20 using a melt of thermoplastic polymer. The solidified polymer melt 36 together with the potting collars 20 forms potting caps on each end of the housing 15, extending the overall length to 314 mm;
5. The tubular housing 15 with the bundle 10 of hollow fiber membranes disposed therein, after potting, reopening the ends of the fibers within the bundle 10 by cutting off a part of the end walls 45 formed in the potting step, and removal of the potting collars 20. The overall length of the device after cutting is 297 mm.

Figure 2:
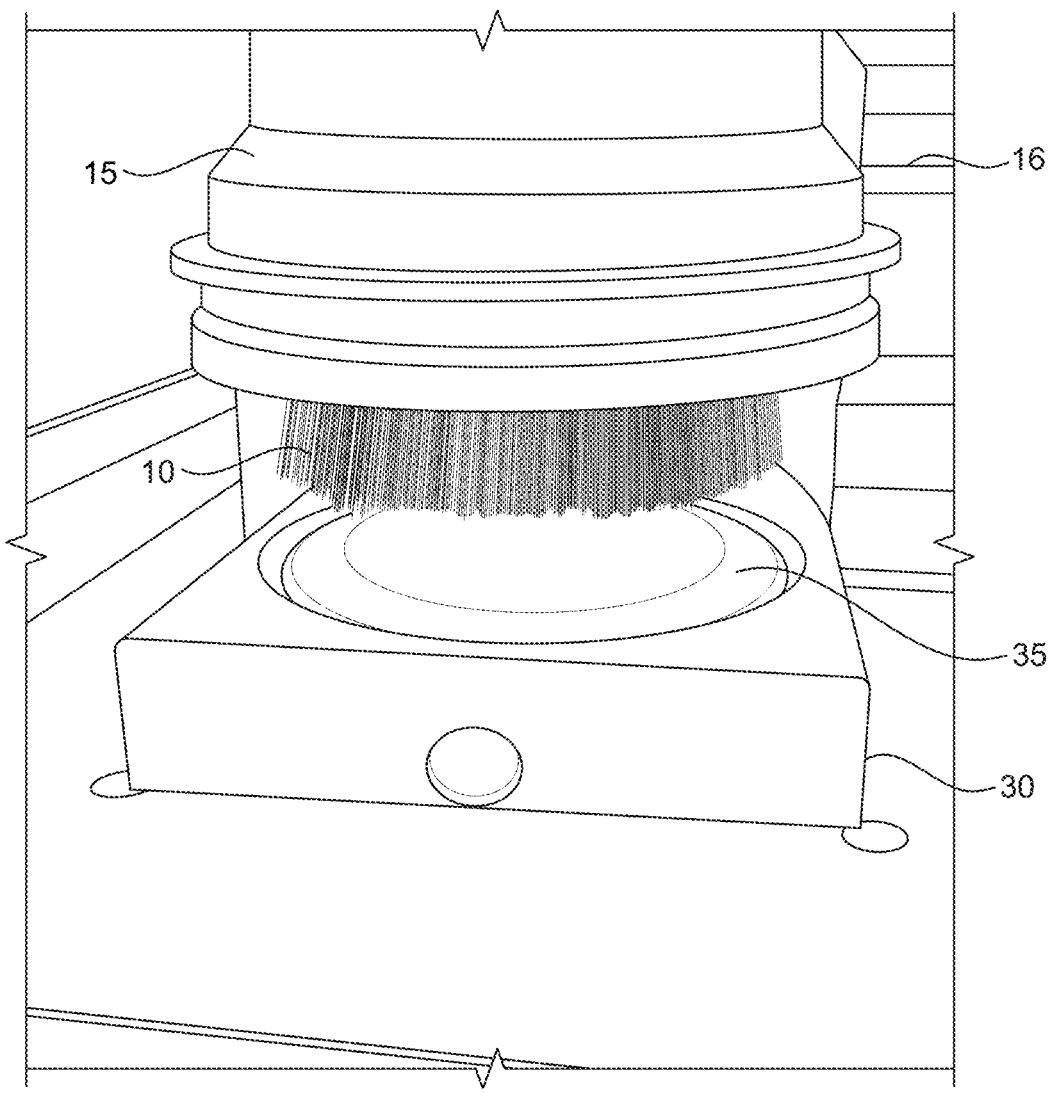
FIG. 2 is a partial view of a detail of a filtration and/or diffusion device in a stage of another embodiment of the process of the present disclosure.

FIG. 2 is a partial view of a detail of a filtration and/or diffusion device in a stage of another embodiment of the process of the present disclosure. FIG. 2 shows part of a tubular housing 15 featuring a fluid port 16 and of a bundle 10 of hollow fiber membranes disposed in the housing 15. The ends of the fibers of the bundle 10 protrude from the mouth of the housing 15. A melt 35 of a thermoplastic polymer is disposed in a crucible 30 having an inner diameter which is larger than the outer diameter of the fiber bundle 10. FIG. 2 is a snapshot of the situation before the end of the fiber bundle 10 is dipped into the melt 35 of thermoplastic polymer to close the ends of the fibers within the bundle 10. The melt 35 is then allowed to solidify and the solidified melt adhering to the end of the bundle 10 is removed from the crucible 30.

Figure 3:
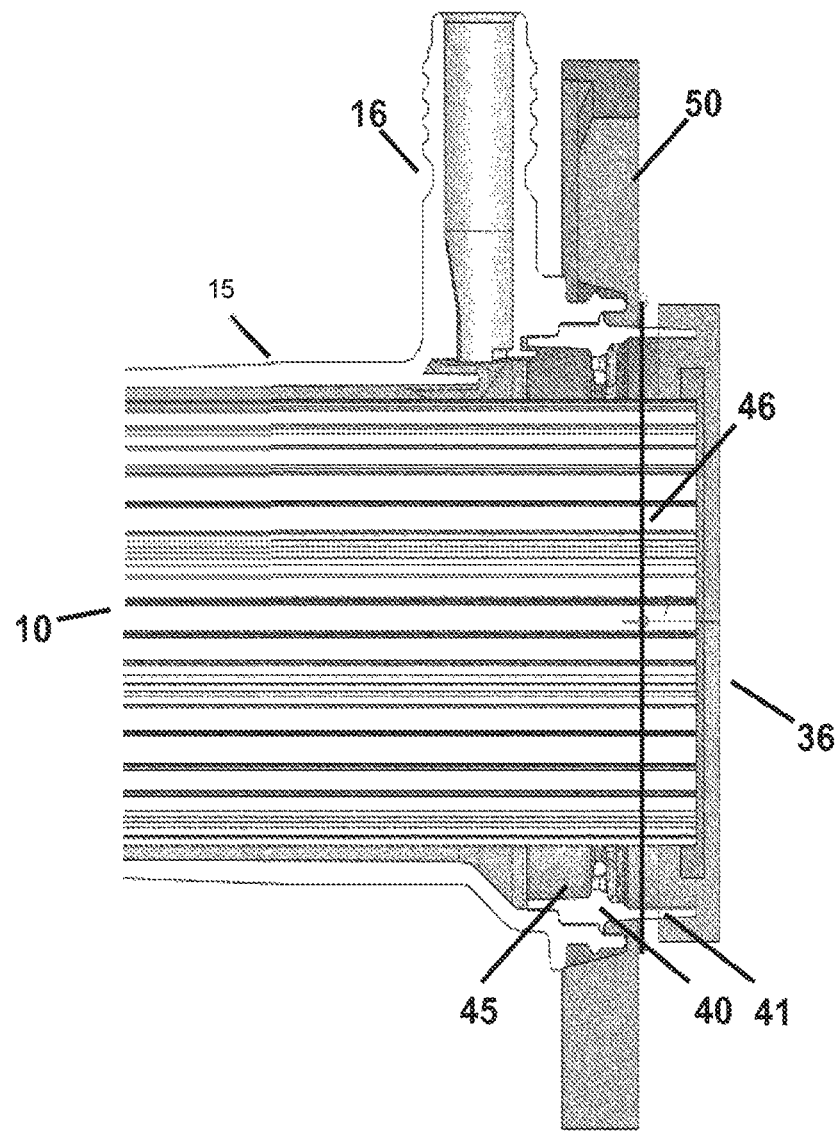
FIG. 3 is a schematic partial view of a longitudinal section of a filtration and/or diffusion device in a stage of a further embodiment of the process of the present disclosure.

FIG. 3 is a schematic partial view of a longitudinal section of a filtration and/or diffusion device in a stage of a further embodiment of the process of the present disclosure. FIG. 3 shows part of a tubular housing 15 featuring a fluid port 16 and of a bundle 10 of hollow fiber membranes disposed in the housing 15. The ends of the fibers of the bundle 10 protrude from the mouth of the housing 15. A support ring 40 comprising a tubular projection 41 protruding from the mouth of the housing 15 is mounted inside the housing 15. FIG. 3 shows the situation after closure of the ends of the bundle 10 of hollow fiber membranes and the mouth of the tubular projection of the support ring 40 by solidified melt 36 of a thermoplastic polymer, thus forming a potting cap, and subsequent formation of end walls 45 by potting the ends of the bundle 10 using a potting resin. The support ring 40 is partially embedded in the end walls, providing an additional anchor for the end walls 45. In a subsequent process step, the ends of the bundle 10 will be cut off together with the solidified polymer melt 36 and part of the end wall 45 to reopen the fibers of the bundle 10. The position of the cut 46 is shown in FIG. 3. A bracket 50 is applied to the end of the housing 15 to stabilize the support ring 40 on its outside and facilitate a clean cut.

EXAMPLE

A bundle of hollow fiber membranes based on polyethersulfone and polyvinylpyrrolidone was disposed in a housing comprised of polycarbonate and having an outer diameter at the mouth of 59 mm. The ends of the bundle protruded from the mouth of the housing by 1 mm. Polyethylene (Purell® 2410T, BASF SE) was heated to 280° C. to produce a melt. 6.5 g of the melt were transferred into a crucible having a diameter of 61 mm and a depth of 3 mm. One end of the housing comprising the fiber bundle was immersed in the melt until the ends of the fibers were positioned at approximately 1 mm from the bottom of the crucible, and then the polyethylene melt was allowed to solidify. After 20 seconds, the housing was removed from the crucible. The melt had solidified into a continuous block, sealing the ends of the fibers and the mouth of the housing, thus forming a potting cap.

The procedure was repeated with the second end of the housing. Subsequently, the ends of the fiber bundle in the housing were potted with polyurethane to form end walls. The fibers in the bundle were re-opened by cutting off the ends of the embedded fibers together with part of the end walls and the polyethylene block. Finally, end caps were mounted on both ends of the housing to obtain a filtration and/or diffusion device.

LIST OF REFERENCE SIGNS 10 bundle of hollow fiber membranes
15 tubular filter casing
16 fluid port
20 potting collar
30 crucible
35 polymer melt
36 solidified polymer melt 40 support ring
41 tubular projection
45 end wall
46 position of end-cut
50 bracket

The invention claimed is:

1. A process for the production of a filtration and/or diffusion device comprising a bundle of hollow fiber membranes disposed within a tubular housing, the process comprising the steps of:
sealing a first end of the bundle of hollow fiber membranes by dipping the first end of the bundle into a melt of thermoplastic resin and allowing the melt to solidify;
sealing a first end of the tubular housing corresponding to the first end of the bundle by dipping the first end of the tubular housing into a melt of thermoplastic resin and allowing the melt to solidify;
followed by a first potting step which involves the formation of end walls within the tubular housing by embedding the ends of the bundle in a potting resin; and
a first subsequent step which involves re-opening the fibers by cutting off the ends of the potted bundle together with part of the solidified potting resin after the potting resin has set and the end walls have been formed;
further comprising the steps of
sealing a second end of the bundle of hollow fiber membranes by dipping the second end of the bundle into a melt of thermoplastic resin and allowing the melt to solidify;
sealing a second end of the tubular housing corresponding to the second end of the bundle by dipping the second end of the tubular housing into a melt of thermoplastic resin and allowing the melt to solidify;
followed by a second potting step comprising the formation of end walls within the tubular housing by embedding the ends of the bundle in a potting resin; and
a second subsequent step which involves reopening the fibers by cutting off the ends of the potted bundle together with part of the solidified potting resin after the potting resin has set and the end walls have been formed,
wherein the first and the second end of the bundle of hollow fiber membranes and the first and the second end of the tubular housing are sealed prior to the second potting step, and
wherein the ends of the tubular housing each feature a potting collar, the potting collar being a separate tubular component part mounted on the respective end of the tubular housing; and wherein the mouth of the potting collar is dipped into the melt of thermoplastic resin and is scaled instead of the end of the tubular housing.

2. The process of claim 1, wherein the diameter of the potting collar is larger on one end of the potting collar than on the other end of the potting collar, wherein the larger diameter matches the outer diameter of the tubular housing and the wherein the smaller diameter matches the diameter of the bundle.

3. The process of claim 1, wherein the potting collars and the melt of thermoplastic resin comprise the same thermoplastic resin.

4. The process of claim 1, wherein the thermoplastic resin is a polyolefin.

5. The process of claim 4, wherein the polyolefin is polyethylene.

6. A process for the production of a filtration and/or diffusion device comprising a bundle of hollow fiber membranes disposed within a tubular housing, the process comprising the steps of:
sealing a first end of the bundle of hollow fiber membranes by dipping the first end of the bundle into a melt of thermoplastic resin and allowing the melt to solidify;
sealing a first end of the tubular housing corresponding to the first end of the bundle by dipping the first end of the tubular housing into a melt of thermoplastic resin and allowing the melt to solidify;
followed by a first potting step which involves the formation of end walls within the tubular housing by embedding the ends of the bundle in a potting resin; and
a first subsequent step which involves re-opening the fibers by cutting off the ends of the potted bundle together with part of the solidified potting resin after the potting resin has set and the end walls have been formed;
further comprising the steps of
sealing a second end of the bundle of hollow fiber membranes by dipping the second end of the bundle into a melt of thermoplastic resin and allowing the melt to solidify;
sealing a second end of the tubular housing corresponding to the second end of the bundle by dipping the second end of the tubular housing into a melt of thermoplastic resin and allowing the melt to solidify;
followed by a second potting step comprising the formation of end walls within the tubular housing by embedding the ends of the bundle in a potting resin; and
a second subsequent step which involves reopening the fibers by cutting off the ends of the potted bundle together with part of the solidified potting resin after the potting resin has set and the end walls have been formed,
wherein the first and the second end of the bundle of hollow fiber membranes and the first and the second end of the tubular housing are sealed prior to the second potting step, and
wherein at each end of the tubular housing, a support ring is disposed within the tubular housing, the support ring being a separate annular component part mounted on a ledge inside the tubular housing, and featuring a tubular projection protruding from the mouth of the tubular housing at the corresponding end of the tubular housing, and
wherein the mouth of the tubular projection is dipped into the melt of thermoplastic resin and is sealed instead of the end of the tubular housing.

7. The process of claim 6, wherein the material of the tubular projection is polyethylene.

8. The process of claim 6, wherein the material of the tubular projection is different from the material of the remainder of the support ring.

9. The process of claim 8, wherein the material of the remainder of the support ring is polypropylene.

10. The process of claim 9, wherein the material of the remainder of the support ring is polypropylene.

11. The process of claim 6, wherein the thermoplastic resin is a polyolefin.

12. The process of claim 11, wherein the polyolefin is polyethylene.

* * * * *